United States Patent
Akiyama

(10) Patent No.: US 9,135,533 B2
(45) Date of Patent: Sep. 15, 2015

(54) INFORMATION PROCESSING APPARATUS CONFIGURED TO ESTABLISH A WORKFLOW USING PLUGINS, INFORMATION PROCESSING METHOD, AND COMPUTER-READABLE STORAGE MEDIUM PERFORMING THE SAME

(71) Applicant: Chiaki Akiyama, Kanagawa (JP)

(72) Inventor: Chiaki Akiyama, Kanagawa (JP)

(73) Assignee: Ricoh Company Limited, Tokyo (JP)

( * ) Notice: Subject to any disclaimer, the term of this patent is extended or adjusted under 35 U.S.C. 154(b) by 0 days.

(21) Appl. No.: 13/713,383

(22) Filed: Dec. 13, 2012

(65) Prior Publication Data

US 2013/0169987 A1 Jul. 4, 2013

(30) Foreign Application Priority Data

Dec. 28, 2011 (JP) .................. 2011-289757

(51) Int. Cl.
*G06K 15/02* (2006.01)
*G06F 3/12* (2006.01)
*G06F 9/445* (2006.01)

(52) U.S. Cl.
CPC .............. *G06K 15/18* (2013.01); *G06F 3/1205* (2013.01); *G06F 3/1225* (2013.01); *G06F 3/1254* (2013.01); *G06F 3/1284* (2013.01); *G06F 9/44505* (2013.01); *G06F 9/44526* (2013.01)

(58) Field of Classification Search
None
See application file for complete search history.

(56) References Cited

U.S. PATENT DOCUMENTS

| | | | |
|---|---|---|---|
| 2005/0105135 A1* | 5/2005 | Takahashi | 358/1.18 |
| 2006/0209329 A1* | 9/2006 | Akiyama | 358/1.13 |
| 2008/0024802 A1* | 1/2008 | Kato | 358/1.9 |
| 2008/0291502 A1* | 11/2008 | Horikawa | 358/448 |
| 2008/0307428 A1* | 12/2008 | Hagiwara et al. | 718/106 |

FOREIGN PATENT DOCUMENTS

| | | |
|---|---|---|
| JP | 2006-260245 | 9/2006 |
| JP | 2008-305004 | 12/2008 |

* cited by examiner

*Primary Examiner* — King Poon
*Assistant Examiner* — Andrew H Lam
(74) *Attorney, Agent, or Firm* — Harness, Dickey & Pierce, P.L.C.

(57) ABSTRACT

An information processing apparatus includes a storage unit configured to store a plugin that is a program for executing a print process and at least one library that represents a component of the plugin; a generation unit configured to generate an intermediate file that includes image data to be printed and print setting information for the image data; a plugin execution unit configured to execute the plugin that includes the at least one library and to reflect a print setting by the plugin to the print setting information; and an output unit configured to output an intermediate file that includes the image data and the print setting information to which the print setting by the plugin has been reflected.

9 Claims, 16 Drawing Sheets

FIG.3A

| WORKFLOW DEFINITION | EXPLANATION |
|---|---|
| WORKFLOW NAME | NAME OF WORKFLOW |
| WORKFLOW ICON | ICON OF WORKFLOW |
| EDIT WORKFLOW ORDER | DEFINITION OF PROCESSING ORDER OF EDIT PLUGIN |
| OUTPUT WORKFLOW ORDER | DEFINITION OF PROCESSING ORDER OF OUTPUT PLUGIN |
| DEFAULT PRINTER NAME | DEFAULT-SETTING PRINTER NAME |

FIG.3B

```
workflow.name=Workflow Name
workflow.icon=Icon Image File Path
workflow.workflow.edit=plug-in1, plug-in2, plug-in3
workflow.workflow.output=plug-in4, plug-in5, plug-in6
workflow.defaultPrinter=Printer Name
```

FIG.4A

| PLUGIN ATTRIBUTE | EXPLANATION |
|---|---|
| PLUGIN NAME | NAME OF PLUGIN |
| PLUGIN ICON | ICON OF PLUGIN |
| PLUGIN ID | ID TO IDENTIFY PLUGIN |
| PLUGIN TYPE | ATTRIBUTE INDICATING "EDIT" PLUGIN OR "OUTPUT" PLUGIN |
| PRINT SETTING CHANGE PROCESSING | ATTRIBUTE INDICATING WHETHER TO CHANGE PRINT SETTING |
| COLOR PRINT SETTING CHANGE PROCESSING | ATTRIBUTE INDICATING WHETHER TO CHANGE COLOR PRINT SETTING |
| DUPLEX PRINT SETTING CHANGE PROCESSING | ATTRIBUTE INDICATING WHETHER TO CHANGE DUPLEX PRINT SETTING |
| PREVIEW SETTING PROCESSING | ATTRIBUTE INDICATING WHETHER TO PERFORM PREVIEW DISPLAY |
| OUTPUT DEVICE SETTING PROCESSING | ATTRIBUTE INDICATING WHETHER TO CHANGE SETTING OF OUTPUT DEVICE |

FIG.4B

```
plugin.name=Plug-in Name
plugin.icon =Icon Image File Path
plugin.id=Plug-in ID
plugin.type=Edit/Output
plugin.printSetting=Yes/No
plugin.printSetting.color=Yes/No
plugin.printSetting.duplex=Yes/No
plugin.preview=Yes/No
plugin.outputDecide=Yes/No
```

FIG.5A

| PRINT RULE | | EXPLANATION |
|---|---|---|
| RULE NAME | | NAME OF RULE |
| RULE ID | | ID TO IDENTIFY PRINT RULE FILE |
| CONDITION SETTING | TYPE | NO CONDITION TYPE/KEYWORD/JOB NAME/PRINT SETTING etc. |
| | SIGN | SIGN FOR CONDITION DECISION EQUAL/NON-EQUAL/EQUAL OR ABOVE/EQUAL OR BELOW/ABOVE/BELOW etc. |
| VALUE | | VALUE OF COMPARISON TARGET |
| PROCESSING SETTING | COLOR SETTING | SETTING AS TO WHETHER TO PERFORM COLOR PRINTING OR PERFORM BLACK-AND-WHITE PRINTING |
| | DUPLEX PRINT SETTING | SETTING AS TO WHETHER TO PERFORM DUPLEX PRINTING |
| | PREVIEW | SETTING AS TO WHETHER TO PERFORM PREVIEW DISPLAY |
| | PRINTER NAME | SETTING OF PRINTER NAME OF OUTPUT DESTINATION |

FIG.5B

```
rule.name=Rule Name
rule.id=Rule ID

#Conditions
plugin.internal.condition.kind=None/Keyword/JobName/PrintSetting
plugin.internal.condition.operator="=="/"!="/"<="/">="/"<"/">"
plugin.internal.condition.value=Value

#Actions
plugin.internal.action.printSetting.color=color/mono
plugin.internal.action.printSetting.duplex=On/Off
plugin.internal.action.preview=On/Off
plugin.internal.action.output.printerName=Printer Name
```

FIG.9

| MESSAGE | EXAMPLE OF MESSAGE CONTENT |
|---|---|
| MESSAGE 1 | PRINT SETTING "xxx" IS SET IN MULTIPLE PLUGINS.<br>PLEASE MAKE CONFIRMATION SINCE OUTPUT TO UNINTENDED OUTPUT DESTINATION IS POSSIBLE.<br>PLUGIN NAMES: "PLUGIN_A", "PLUGIN_B"<br><br>※TARGET PRINT SETTING NAME IS APPLIED TO "xxx" |
| MESSAGE 2 | PRINTER IS SET IN MULTIPLE PLUGINS.<br>PLEASE MAKE CONFIRMATION SINCE OUTPUT TO UNINTENDED OUTPUT DESTINATION IS POSSIBLE.<br>PLUGIN NAMES: "PLUGIN_C", "PLUGIN_D" |
| MESSAGE 3 | PRINT SETTING "xxx" CANNOT BE SET IN PRINTER "yyy".<br>PLEASE MAKE CONFIRMATION SINCE OUTPUT TO UNINTENDED OUTPUT DESTINATION IS POSSIBLE.<br>PLUGIN NAMES: "PLUGIN_E", "PLUGIN_F"<br><br>※TARGET PRINT SETTING IS APPLIED TO "xxx" AND TARGET OUTPUT DESTINATION DEVICE NAME IS APPLIED TO "yyy" |
| MESSAGE 4 | PRINT SETTING AND OUTPUT DESTINATION CAN BE CHANGED AFTER PREVIEW DISPLAY.<br>PLEASE MAKE CONFIRMATION SINCE OUTPUT TO UNINTENDED OUTPUT DESTINATION IS POSSIBLE. |

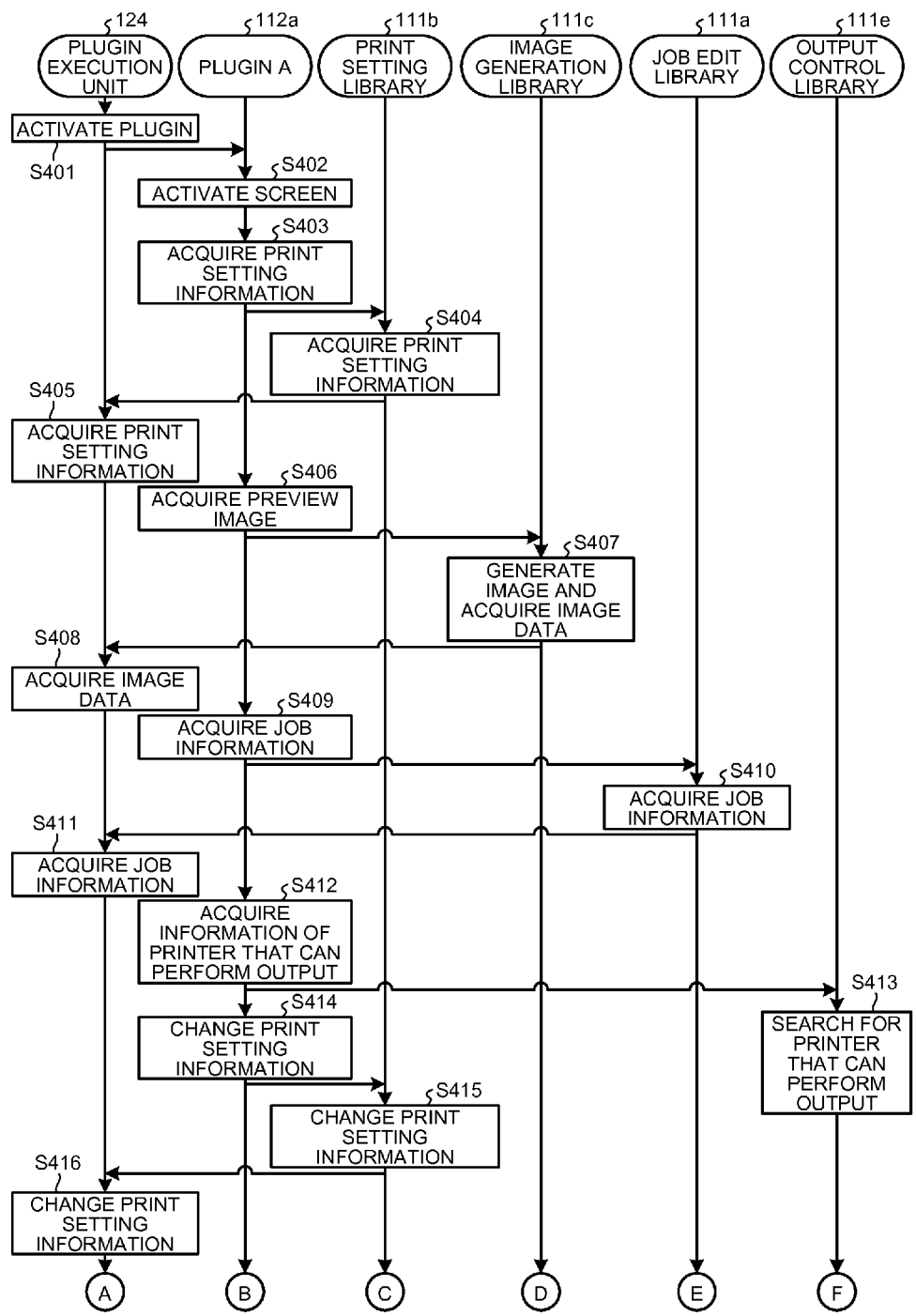

INFORMATION PROCESSING APPARATUS CONFIGURED TO ESTABLISH A WORKFLOW USING PLUGINS, INFORMATION PROCESSING METHOD, AND COMPUTER-READABLE STORAGE MEDIUM PERFORMING THE SAME

CROSS-REFERENCE TO RELATED APPLICATION

The present application claims priority to and incorporates by reference the entire contents of Japanese Patent Application No. 2011-289757 filed in Japan on Dec. 28, 2011.

BACKGROUND OF THE INVENTION

1. Field of the Invention

The present invention relates to an information processing apparatus, an information processing method and a computer-readable storage medium.

2. Description of the Related Art

There is a case where various kinds of control related to print settings are performed when performing printing using an image forming device such as a printer from an information processing apparatus such as a personal computer (PC). Examples of the various kinds of control include a control by a preview display function to check a print output result in advance, a control to change to a preferable print setting by a keyword contained in print data, and a control to check a printer status and change the output destination to a printer that can perform an output.

Also, in recent years, there is a technique of simplifying a print setting operation with respect to a plurality of print jobs by applying a common print setting in the print jobs to intermediate data including print setting information with respect to document data and drawing information to cause a printer to draw the document data.

However, in such a conventional technique, there is a problem that it is not possible to flexibly perform a print setting. To be more specific, various kinds of control related to print settings hold many functions and therefore the specification becomes complicated, that is, since the user may not make full use of them, it is difficult to flexibly perform a print setting. Also, in the case of introducing a system including control supporting specific user needs, if there is even a slight difference from other user needs, another system supporting the slight difference is introduced. Further, since these systems may be difficult for other users to use, the system becomes significant. Also, in the technique of applying a common print setting in the print jobs to intermediate data, while it is possible to simplify a print setting operation, it is not possible to flexibly perform a print setting.

Therefore, there is a need for an information processing apparatus and an information processing method that can flexibly perform a print setting.

SUMMARY OF THE INVENTION

It is an object of the present invention to at least partially solve the problems in the conventional technology.

According to an embodiment, there is provided an information processing apparatus that includes a storage unit configured to store a plugin that is a program for executing a print process and at least one library that represents a component of the plugin; a generation unit configured to generate an intermediate file that includes image data to be printed and print setting information for the image data; a plugin execution unit configured to execute the plugin that includes the at least one library and to reflect a print setting by the plugin to the print setting information; and an output unit configured to output an intermediate file that includes the image data and the print setting information to which the print setting by the plugin has been reflected.

According to another embodiment, there is provided an information processing method that includes generating an intermediate file that includes image data to be printed and print setting information for the image data; executing a plugin that is a program for executing a print process to reflect a print setting by the plugin to the print setting information, the plugin including at least one library that represents a component of the plugin, the plugin and the at least one library being stored in a storage unit; and outputting an intermediate file that includes the image data and the print setting information to which the print setting by the plugin has been reflected.

According to still another embodiment, there is provided a non-transitory computer-readable storage medium with an executable program stored thereon. The program instructs a computer that includes a storage unit configured to store a plugin that is a program for executing a print process and at least one library that represents a component of the plugin, to perform: generating an intermediate file that includes image data to be printed and print setting information for the image data; executing the plugin that includes the at least one library to reflect a print setting by the plugin to the print setting information; and outputting an intermediate file that includes the image data and the print setting information to which the print setting by the plugin has been reflected.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3A illustrates a workflow definition example that can be defined in a workflow definition file;

FIG. 3B illustrates a content example of a workflow definition file;

FIG. 4A illustrates a plugin attribute example defined in a plugin attribute file;

FIG. 4B illustrates a content example of a plugin attribute file;

FIG. 5A illustrates a print rule defined in a print rule file;

FIG. 5B illustrates a content example of a print rule file;

FIG. 9 illustrates content examples of alert messages in the print execution possibility determination process;

FIGS. 11A and 11B illustrate an example of a sequence process by a plugin using a job edit library, a print setting library, an image generation library and an output control library;

DETAILED DESCRIPTION OF THE PREFERRED EMBODIMENTS

Embodiments according to the present invention will be explained below with reference to the accompanying drawings. Also, the present invention is not limited to the following embodiments.

First Embodiment

System Configuration

Figure 1:
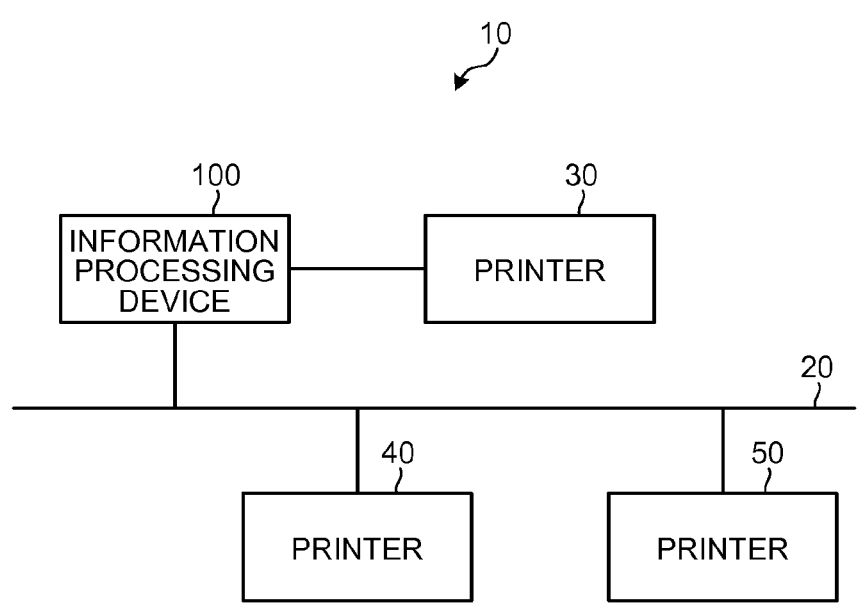
FIG. 1 is a view illustrating a configuration example of a print system according to a first embodiment.

Using FIG. 1, a configuration of a print system according to a first embodiment will be explained. FIG. 1 is a view illustrating a configuration example of the print system according to the first embodiment.

For example, as illustrated in FIG. 1, a print system 10 includes an information processing apparatus 100, a printer 30, a printer 40 and a printer 50. Among these, the information processing apparatus 100, the printer 40 and the printer 50 are connected to a network 20. Also, the printer 30 is not connected to the network 20 but is connected to the information processing apparatus 100 by a cable or the like.

Also, for example, the printer 30, the printer 40 and the printer 50 may denote a multi-function printer (MFP) having at least a printer function among a copy function, the printer function, a scanner function and a facsimile function. Also, the information processing apparatus 100 denotes, for example, an information processing apparatus such as a PC. Also, although FIG. 1 illustrates a case where the print system 10 includes an information processing apparatus and three printers, the numbers are not limited to these. In the following, a case will be explained where the information processing apparatus 100 performs printing using the printer 30, the printer 40 or the printer 50.

In the above configuration, the information processing apparatus 100 executes a plugin that is a program to execute print process related to printing, reflects a print setting by the executed plugin to print setting information with respect to image data of the print target and outputs an intermediate file including the image data and the print setting information. Also, when registering a plugin, the information processing apparatus 100 determines whether it is possible to perform printing based on the registered plugin.

Accordingly, by executing a plugin combining various print functions, the information processing apparatus 100 can flexibly perform a print setting. In addition, in a registration of a plugin combining various print functions, the information processing apparatus 100 determines whether it is possible to perform printing, and therefore it is possible to register a plugin without conflicted print settings. Also, functions in the information processing apparatus 100 will be described later in detail.

Functions of Information Processing Apparatus According to First Embodiment

Figure 2:
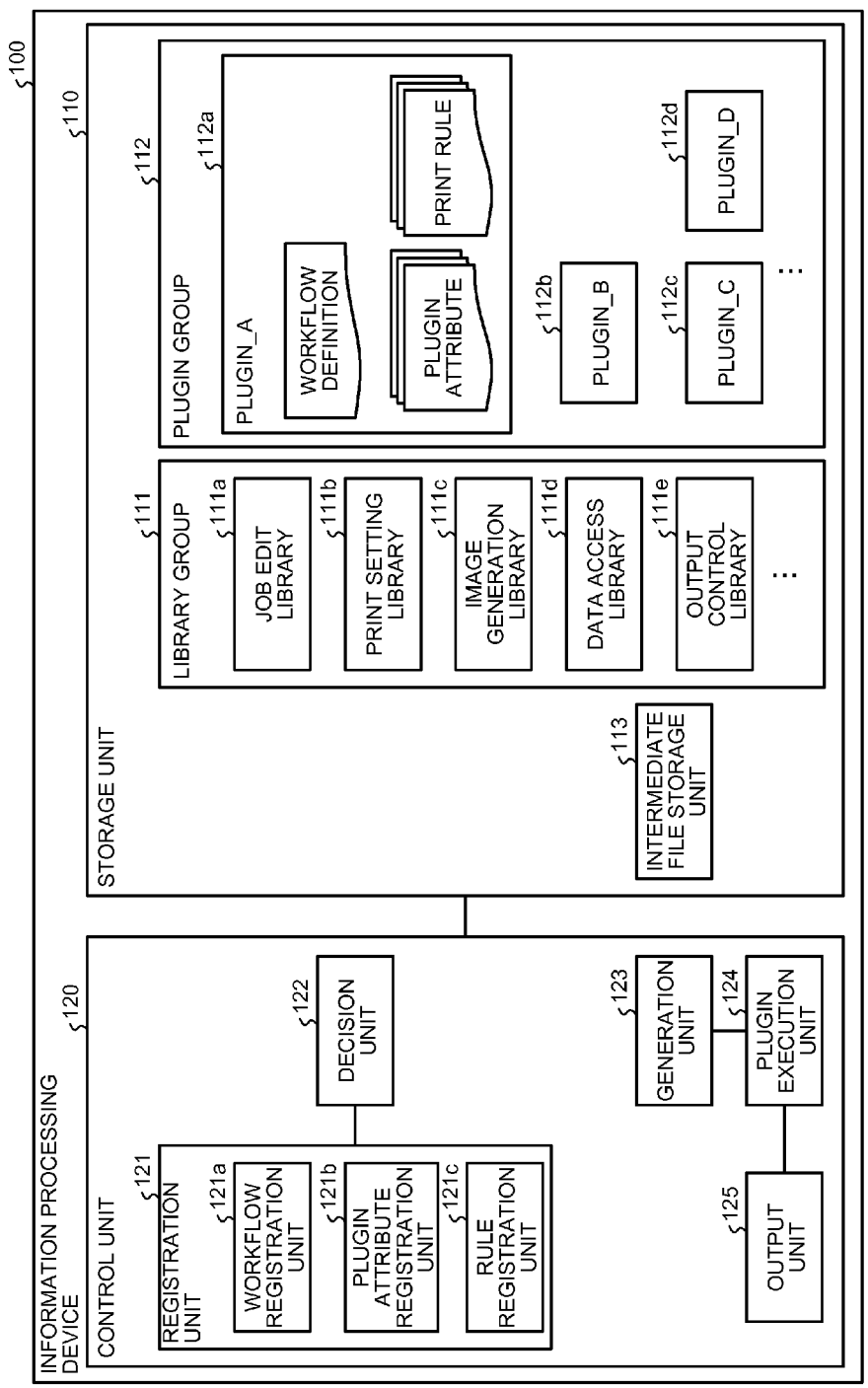
FIG. 2 is a functional block diagram illustrating a configuration example of an information processing apparatus according to the first embodiment.

Next, using FIG. 2, the functions of the information processing apparatus according to the first embodiment will be explained. FIG. 2 is a functional block diagram illustrating a configuration example of the information processing apparatus according to the first embodiment.

For example, as illustrated in FIG. 2, the information processing apparatus 100 includes a storage unit 110 and a control unit 120. The storage unit 110 stores data required for various kinds of process by the control unit 120 and various processes results by the control unit 120. Such the storage unit 110 includes, for example, a library group 111, a plugin group 112 and an intermediate file storage unit 113. Also, the storage unit 110 is a storage device such as a semiconductor memory element including a random access memory (RAM), a read only memory (ROM) and a flash memory, and a hard disk and an optical disk.

The library group 111 stores libraries representing components of a plugin as a program to perform print process. For example, the library group 111 includes a job edit library 111a, a print setting library 111b, an image generation library 111c, a data access library 111d and an output control library 111e. In print setting customization using these libraries, for example, customization is possible in association with a virtual printer, a logical printer, a physical printer, print data, a print setting or an output.

The job edit library 111a denotes, for example, a library to provide an interface to change or delete a job output order. Also, the print setting library 111b denotes, for example, a library to provide an interface to acquire the current print setting or print setting performance and perform print setting. Also, the image generation library 111c denotes, for example, a library to provide an interface to generate an image file such as bitmap (BMP) and JPEG (Joint Photograph Experts Group) from print data. Also, the data access library 111d denotes, for example, a library to provide an interface to analyze text information of print data and determine whether there is a designated text. Also, the output control library 111e denotes, for example, a library to provide an interface to acquire information of the output destination that can perform an output, and set the output destination.

The plugin group 112 includes one or multiple libraries and stores a plugin as a program to perform print process. For example, the plugin group 112 includes a plugin_A 112a, a plugin_B 112b, a plugin_C 112c and a plugin_D 112d. Also, each plugin is associated with a workflow definition file, a plugin attribute file and a print rule file that are files representing the configuration information of each plugin. To be more specific, the workflow definition file defines workflow definition that fixes the timing and order of plugin execution. Also, the plugin attribute file defines a plugin attribute that is the attribute of a plugin. Also, the print rule file defines a process and a print rule that is conditions for performing the process. In a plugin, there is a case where multiple plugin attributes and multiple print rules are present with respect to one workflow definition. Such a plugin realizes various print functions using the above libraries. Also, plugin execution process does not matter, and it may be possible to adopt an add-in format of one process or adopt a format of independent processes.

Here, using FIG. 3A to FIG. 5B, the workflow definition, the plugin attribute and the print rule will be explained. FIG. 3A illustrates a workflow definition example that can be defined in a workflow definition file. Also, FIG. 3B illustrates a content example of the workflow definition file. Also, FIG. 4A illustrates a plugin attribute example defined in the plugin attribute file. Also, FIG. 4B illustrates a content example of the plugin attribute file. Also, FIG. 5A illustrates a print rule defined in the print rule file. Also, FIG. 5B illustrates a content example of the print rule file.

For example, as illustrated in FIG. 3A ad FIG. 3B, the workflow definition file includes, as the workflow definition: a workflow name; a file path to a workflow icon; the order of plugins related to a print edit; the order of plugins related to a print output; and the printer name of the default-setting output destination.

For example, as illustrated in FIGS. 4A and 4B, the plugin attribute file includes, as plugin attributes: a plugin name; a file path to a plugin icon; a plugin ID (identifier) to identify a plugin; and a plugin type indicating an edit plugin or output plugin. In addition, the plugin attribute file includes: a plugin attribute indicating whether to change a print setting; a plugin attribute indicating whether to change a color print setting; a plugin attribute indicating whether to change a duplex print setting; a plugin attribute indicating whether to perform a preview display; and a plugin attribute indicating whether to change a output device setting. Here, although FIG. 4A or FIG. 4B uses "color" and "duplex printing" as an example of a print setting change, other settings are possible.

For example, as illustrated in FIG. 5A and FIG. 5B, the print rule file includes, as print rules: a rule name; a rule ID to identify a print rule file; a type and sign setting related to print conditions; a comparison target value; and settings related to a process for a print color, duplex printing, preview and printer name. Also, the process execution by a plugin is performed based on the print rule file.

The intermediate file storage unit 113 stores an intermediate file including image data of the print target and print setting information with respect to the image data. For example, the intermediate file storage unit 113 stores an intermediate file including image data of BMP, EMF (Enhanced Meta file) or XPS (XML Paper Specification) not depending on a printer driver and print setting information with respect to the image data.

Generally, in a case where printing is performed by an application operating on an information processing apparatus, data of the application is drawn in a graphic engine and the drawn data is given to a printer driver. Subsequently, the printer driver converts it into a code such as PDL (Page Description Language) that can be recognized by the printer. After that, the converted data is accumulated in a spooler, and, by transmitting the data to the printer by the spooler, printing is performed. That is, in the present embodiment, the printer driver converts drawing data from an application into image data not depending on the printer driver. By this means, the intermediate file storage unit 113 stores the image data, which is converted by the printer driver and does not depend on the printer driver, together with print setting information.

The control unit 120 holds an internal memory that stores a control program, a program to define various process steps and required data. Such the control unit 120 includes a registration unit 121, a determining unit 122, a generation unit 123, a plugin execution unit 124 and an output unit 125. Also, the control unit 120 denotes, for example, an integrated circuit such as an application specific integrated circuit (ASIC) and field programmable gate Array (FPGA) or an electronic circuit such as a central processing unit (CPU) and micro processing unit (MPU).

The registration unit 121 performs a plugin workflow setting and registers a plugin combining libraries in the plugin group 112. To perform the workflow setting, the registration unit 121 includes a workflow registration unit 121a, a plugin attribute registration unit 121b and a rule registration unit 121c. In the plugin registration, by a target icon click operation as a trigger, a screen described below starts up.

Figure 6:
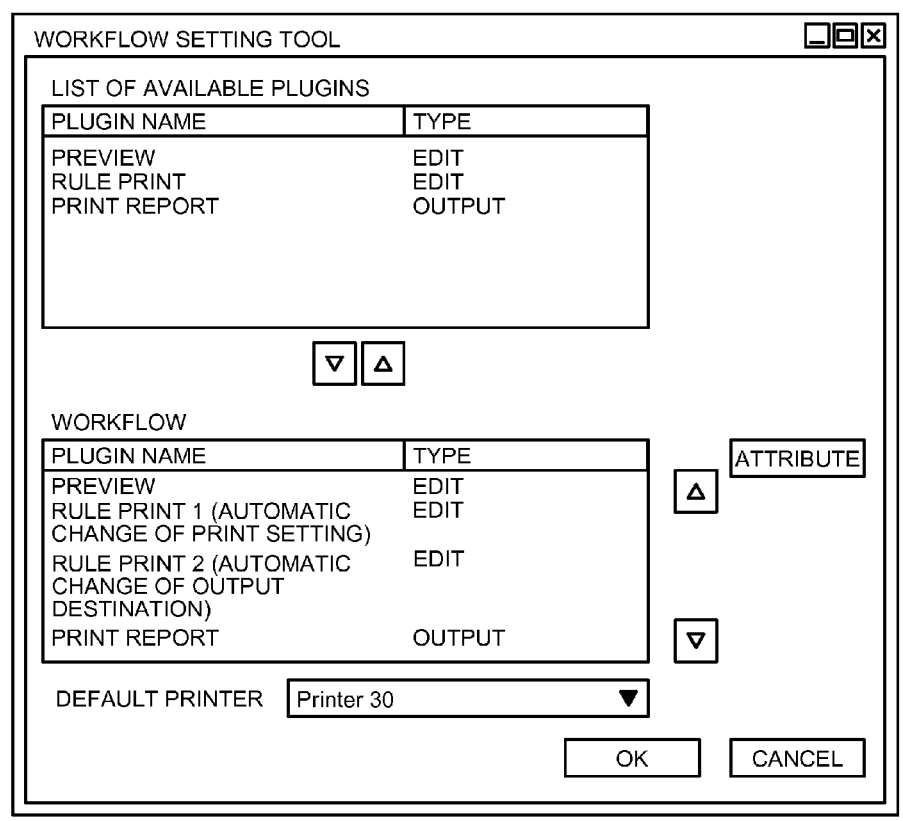
FIG. 6 illustrates an example of a workflow setting screen.

FIG. 6 is a view illustrating an example of a workflow setting screen. For example, as illustrated in FIG. 6, in the workflow setting screen, a plugin selected from a list of available plugins arranged in the upper stage is added to the lower stage, and it is possible to change the order of plugins added to the lower stage. Subsequently, when an "OK" button is pressed, the workflow registration unit 121a registers a print workflow including information related to the print process order, in the plugin group 112 as a workflow definition file.

Also, for each plugin added to the lower stage, by pressing an "attribute" button, it is possible to perform attribute and rule settings. Subsequently, when the "OK" button is pressed, the plugin attribute registration unit 121b registers a plugin attribute including information related to the attribute of the plugin, in the plugin group 112 as a plugin attribute file. Similarly, the rule registration unit 121c registers a print rule including information related to print conditions or print processes, in the plugin group 112 as a print rule file. In addition to these, in the workflow setting screen, it is possible to set a "default printer" representing a default output destination printer. Subsequently, when the "OK" button is pressed, the workflow registration unit 121a registers a print workflow including information related to the print output destination, in the plugin group 112 as a workflow destination file.

Thus, by the process in the registration unit 121, the plugin group 112 registers multiple plugin attribute files and multiple print rule files with respect to one workflow definition file of each plugin. Also, in FIG. 6, addition into the lower stage, deletion from the lower stage or an order change in the lower stage is performed by, for example, pressing the up and down buttons after target item selection or by drug-and-drop operations in an input device such as a mouse.

The determining unit 122 determines whether it is possible to perform print process on a plugin. For example, by determining whether there are inconsistencies in the order of the print process and the print setting every plugin workflow registered by the registration unit 121, the determining unit 122 determines whether it is possible to execute the plugin. To cite a case, the determining unit 122 determines whether there are multiple plugins to perform a color setting change process, whether there are multiple plugins to perform a duplex-printing setting change process, whether there are multiple plugins to perform a printer setting change process, whether it is possible to realize printing by a designated output destination printer function, or whether there are inconsistencies in the order of various settings. When the determining unit 122 determines that it is not possible to perform printing, for example, an alert message to indicate a cause of the impossibility of execution is output to encourage a plugin reregistration. That is, the registration unit 121 registers only a plugin determined by the determining unit 122 as an executable plugin.

The generation unit 123 generates an intermediate file. For example, when printing is performed by an application operating on the information processing apparatus 100, the generation unit 123 generates an intermediate file including print target image data generated via a virtual printer selected by the user and print setting information with respect to the image data. Here, print workflows are determined in a fixed manner depending on virtual printers, and, when a virtual printer is selected, it is determined which plugin is executed. Subsequently, the generation unit 123 stores the generated intermediate file in the intermediate file storage unit 113. Since the image data included in the intermediate file generated in this way is converted into image data not depending on a specific printer driver, it is possible to perform an output in an arbitrary printer.

The plugin execution unit 124 executes a plugin. For example, the plugin execution unit 124 executes a plugin based on the plugin workflow definition file, the plugin attribute files and the print rule files stored in the plugin group 112. At this time, the plugin execution unit 124 reflects the print setting by the executed plugin to the print setting information of the intermediate file stored in the intermediate file storage unit 113.

The output unit 125 outputs an intermediate file to an output destination printer. For example, the output unit 125 outputs an intermediate file including the print setting information to which the print setting by the plugin execution in the plugin execution unit 124 is reflected, and the print target image data, to the output destination printer. Also, in parallel with the output of the intermediate file in the output unit 125, the plugin execution unit 124 may execute a plugin. That is, the plugin execution unit 124 may execute a plugin even while the image data included in the intermediate file is printed by the printer.

Figure 7:
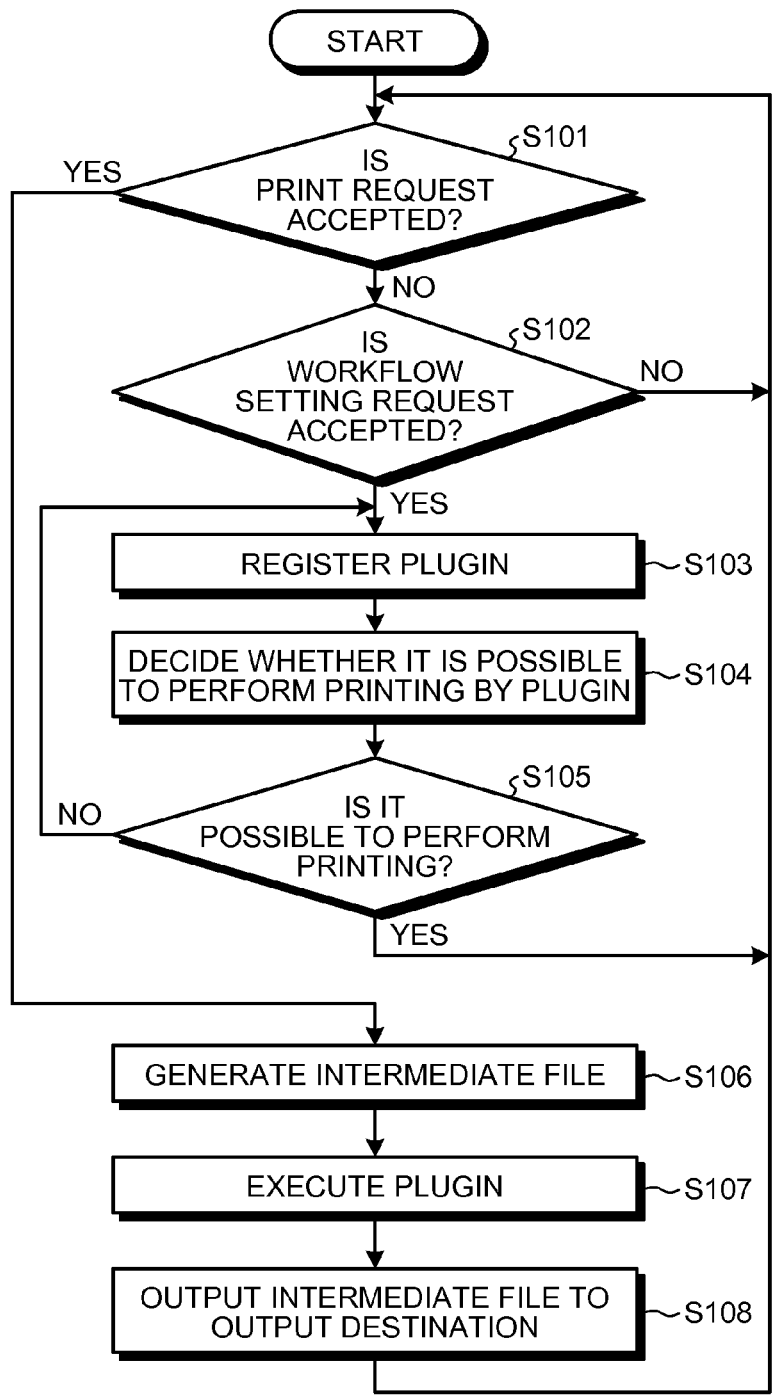
FIG. 7 is a flowchart illustrating an example of the overall process flow in an information processing apparatus according to the first embodiment.

Overall Processing Flow of Information Processing Apparatus According to First Embodiment Next, using FIG. 7, the overall processing flow in the information processing apparatus 100 according to the first embodiment will be explained. FIG. 7 is a flowchart illustrating an example of the overall processing flow in the information processing apparatus 100 according to the first embodiment.

For example, as illustrated in FIG. 7, the information processing apparatus 100 determines whether a print request is accepted (step S101) or whether a workflow setting request is accepted (step S102). At this time, when it is determined that the workflow setting request is accepted (Yes in step S102), the registration unit 121 registers a plugin based on the setting in the workflow setting screen (step S103). Meanwhile, when it is determined that the workflow setting request is not accepted (No in step S102), the information processing apparatus 100 executes the process in step S101 or step S102 again.

Also, the determining unit 122 determines whether it is possible to perform printing by the plugin registered by the registration unit 121 (step S104). Subsequently, when the determining unit 122 determines that it is not possible to perform printing (No in step S105), the registration unit 121 registers a plugin based on the setting in the workflow setting screen again (step S103). Meanwhile, when the determining unit 122 determines that it is possible to perform printing (Yes in step S105), the information processing apparatus 100 performs the process in step S101 or step S102 again.

Also, when it is determined that the print request is accepted (Yes in step S101), the generation unit 123 generates an intermediate file including print target image data and print setting information with respect to the image data (step S106). Also, the plugin execution unit 124 executes the plugin and reflects the print setting by the executed plugin to the print setting information generated by the generation unit 123 (step S107). Also, the output unit 125 outputs an intermediate file including the print setting information to which the print setting by the plugin executed in the plugin execution unit 124 is reflected, and the print target image data, to the output destination printer (step S108). Here, even at the time of the output of the intermediate file, the plugin may be executed.

Also, after the process in step S108, the information processing apparatus 100 performs the process in step S101 or step S102 again.

Figure 8:
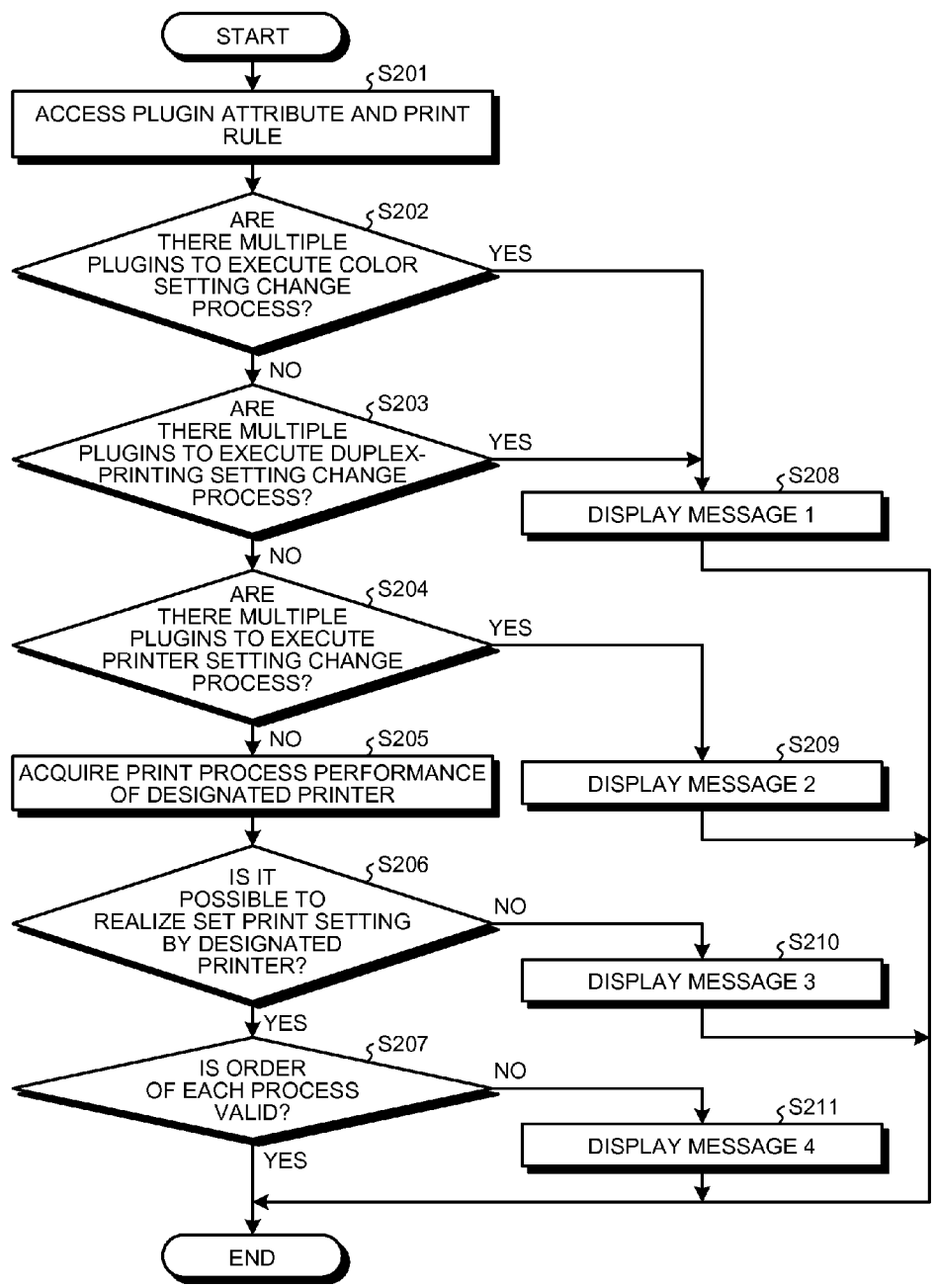
FIG. 8 is a flowchart illustrating a flow example of a print execution possibility determination process according to the first embodiment.

Print Execution Possibility Determination Processing Flow According to First Embodiment Next, using FIG. 8, a flow of a print execution possibility determination process according to the first embodiment will be explained. FIG. 8 is a flowchart illustrating a flow example of the print execution possibility determination process according to the first embodiment. Here, generally, the print execution possibility determination process indicates the process in step S104 illustrated in FIG. 7.

For example, as illustrated in FIG. 8, the determining unit 122 accesses a plugin attribute file and print rule file of a plugin registered by the registration unit 121 (step S201). Subsequently, the determining unit 122 determines whether there are multiple plugins to perform a color print setting change process (step S202). At this time, when the determining unit 122 determines that there are multiple plugins to perform the color print setting change process (Yes in step S202), "message 1" as an alert message is displayed (step S208).

Meanwhile, when determining that there are not multiple plugins to perform the color print setting change process (No in step S202), the determining unit 122 determines whether there are multiple plugins to perform a duplex printint setting change process (step S203). At this time, when the determining unit 122 determines that there are multiple plugins to perform the duplex printint setting change process (Yes in step S203), "message 1" as an alert message is displayed (step S208).

Meanwhile, when determining that there are not multiple plugins to perform the duplex printint setting change process (No in step S203), the determining unit 122 determines whether there are multiple plugins to perform a printer setting change process (step S204). At this time, when the determining unit 122 determines that there are multiple plugins to perform the printer setting change process (Yes in step S204), "message 2" as an alert message is displayed (step S209).

Meanwhile, when determining that there are not multiple plugins to perform the printer setting change process (No in step S204), the determining unit 122 acquires, from a designated printer, the print process performance of the printer (step S205). Subsequently, the determining unit 122 determines whether the print setting set by the plugin can be realized by the designated printer (step S206). At this time, the determining unit 122 determines that the print function set by the plugin is not found in the designated printer and cannot be realized (No in step S206), "message 3" as an alert message is displayed (step S210).

Meanwhile, when determining that it cannot be realized (Yes in step S206), the determining unit 122 determines whether the order of process in the plugin workflow is valid (step S207). At this time, when the determining unit 122 determines that the order of process in the plugin workflow is not valid (e.g. the preview function setting is set before the print setting change or the output destination change) (No in step S207), "message 4" as an alert message is displayed (step S211).

Here, using FIG. 9, content of alert messages in the print execution possibility determination process will be explained. FIG. 9 is a view illustrating content examples of alert messages in the print execution possibility determination process.

For example, as illustrated in FIG. 9, the "message 1" denotes a message displayed in a case where a certain print setting is set in multiple plugins, and this encourages the setting to be check since there may occur an output result that is not intended by the user. Also, the "message 2" denotes a message displayed in a case where the output destination printer is set in multiple plugins, and this encourages the setting to be checked since there may occur an output result that is not intended by the user.

Also, the "message 3" denotes a message displayed in a case where it is not possible to realize a set print setting by the performance of a designated printer, and this encourages the setting to be checked since there may occur an output result that is not intended by the user. Also, the "message 4" denotes a message displayed in a case where the print setting change or the output destination setting change is set after the preview display, and this encourages the setting to be checked since there may occur a case where, after a preview display to visually check an output result, a different output result from that output result is acquired or an output to different output destination is performed.

Print Process Flow According to First Embodiment

Figure 10:
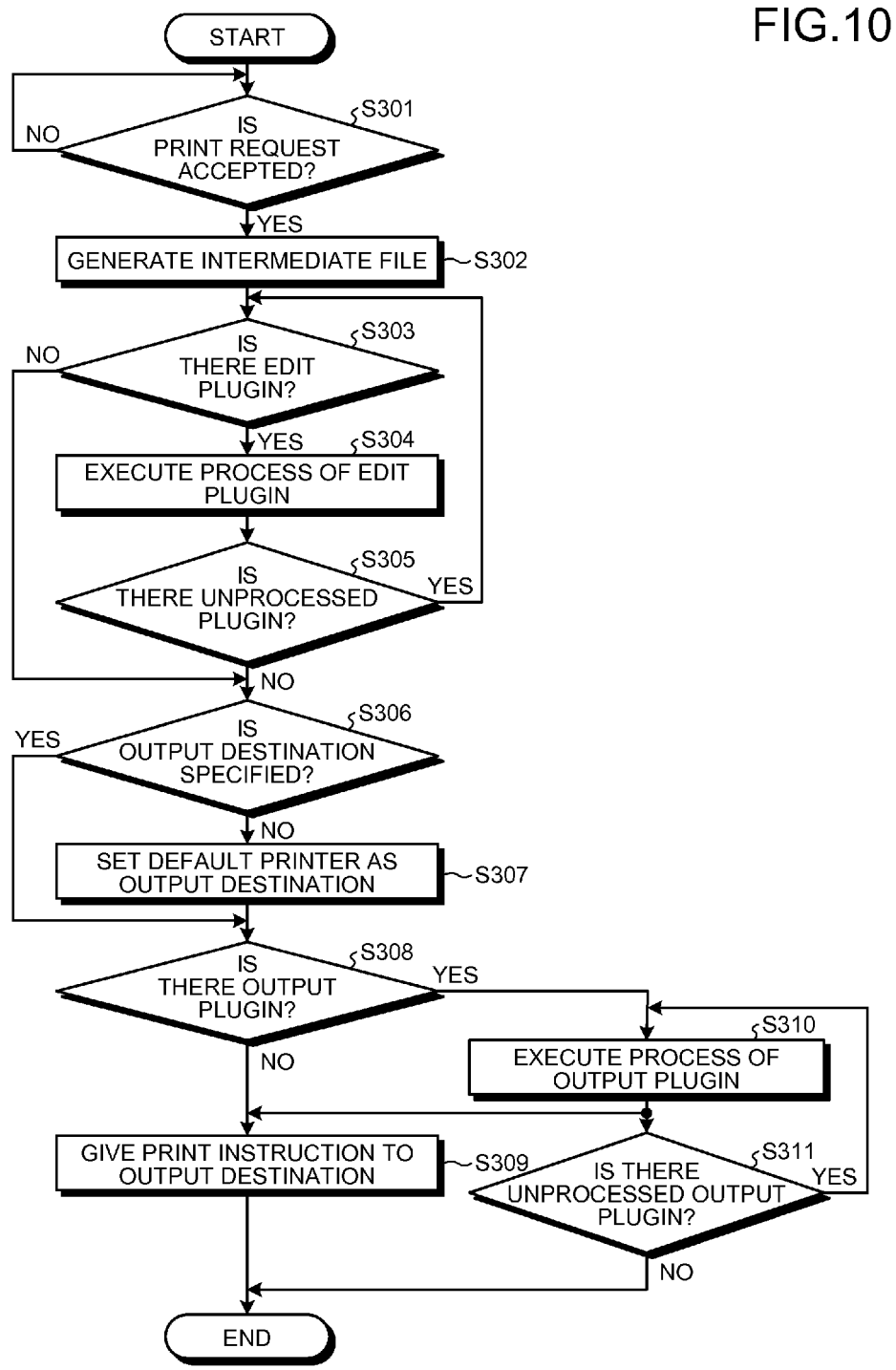
FIG. 10 is a flowchart illustrating an example of a flow of print process according to the first embodiment.

Next, using FIG. 10, a flow of print process according to the first embodiment will be explained. FIG. 10 is a flowchart illustrating an example of a flow of the print process according to the first embodiment. Here, the print process indicates the process in steps S101 and S106 to S108 illustrated in FIG. 7.

For example, as illustrated in FIG. 10, in a case where a print request is accepted (Yes in step S301), the generation unit 123 generates an intermediate file including print target image data generated via a virtual printer and print setting information with respect to the image data (step S302). Also, the plugin execution unit 124 determines whether there is an edit plugin representing a print setting plugin set before a print output, in a plugin determined in a fixed manner depending on the virtual printer (step S303).

At this time, when determining that there is the edit plugin (Yes in step S303), the plugin execution unit 124 performs a process of the edit plugin (step S304). Every time the edit plugin process is performed, the plugin execution unit 124 reflects the print setting by the executed edit plugin to the print setting information of the intermediate file. Subsequently, the plugin execution unit 124 determines whether there is an unprocessed plugin (step S305). Such an unprocessed plugin denotes an edit plugin or an output plugin which will be described later. At this time, when the plugin execution unit 124 determines that there is an unprocessed plugin (Yes in step S305), the process in step S303 is performed again. Meanwhile, when the plugin execution unit 124 determines that there is no edit plugin (No in step S303) or there is no unprocessed plugin (No in step S305), a process in step S306 is performed. By this means, when processes of all edit plugins are performed, all of the print settings by the executed edit plugins are reflected to the print setting information of the intermediate file.

Subsequently, when the plugin execution unit 124 determines that the output destination printer of the intermediate file is not specified (No in step S306), the default-setting printer is set as output destination (step S307). Meanwhile, when the plugin execution unit 124 determines that the output destination printer of the intermediate file is specified (Yes in step S306), a process in step S308 is performed.

After that, the plugin execution unit 124 determines whether there is an output plugin representing a plugin executed at the time of printing in the printer (step S308). At this time, when it is determined that there is no output plugin (No in step S308), the output unit 125 outputs the intermediate file to the output destination printer to instruct printing (step S309). A case where it is determined in step S308 that there is no output plugin, corresponds to a case where it is determined that there is no edit plugin in the first process in step S303 or a case where it is determined in step S305 that there is no unprocessed plugin. However, even in a case where it is determined that there is no edit plugin in the first process in step S303, it does not follow that there is no output plugin.

Meanwhile, when determining that there is an output plugin (Yes in step S308), the plugin execution unit 124 executes a process of the output plugin (step S310) and outputs the intermediate file to the output destination printer via the output unit 125 to instruct printing (step S309). Also, at an arbitrary timing, the plugin execution unit 124 determines whether there is an unprocessed output plugin (step S311). The arbitrary timing denotes, for example, a case where a process of a certain output plugin is finished.

At this time, when determining that there is an unprocessed output plugin (Yes in step S311), the plugin execution unit 124 executes the process of the output plugin (step S310) and outputs the intermediate file to the output destination printer via the output unit 125 to instruct printing (step S309). Meanwhile, when determining that there is no unprocessed output plugin (No in step S311), the plugin execution unit 124 finishes the processing if printing is finished in the output destination printer. That is, the output plugin is executed in parallel with the print process by the printer, and there are output plugins continuously executed during the print process and output plugins sequentially executed during the print process. Examples of the output plugins continuously executed include an output plugin to monitor whether print process is normally performed. Also, examples of the output plugins sequentially executed include an output plugin to cause another printer to perform print process in a case where the print process is stopped by some cause or where only specific data is output by the different printer instead.

Processing by Plugin

Figure 11B:
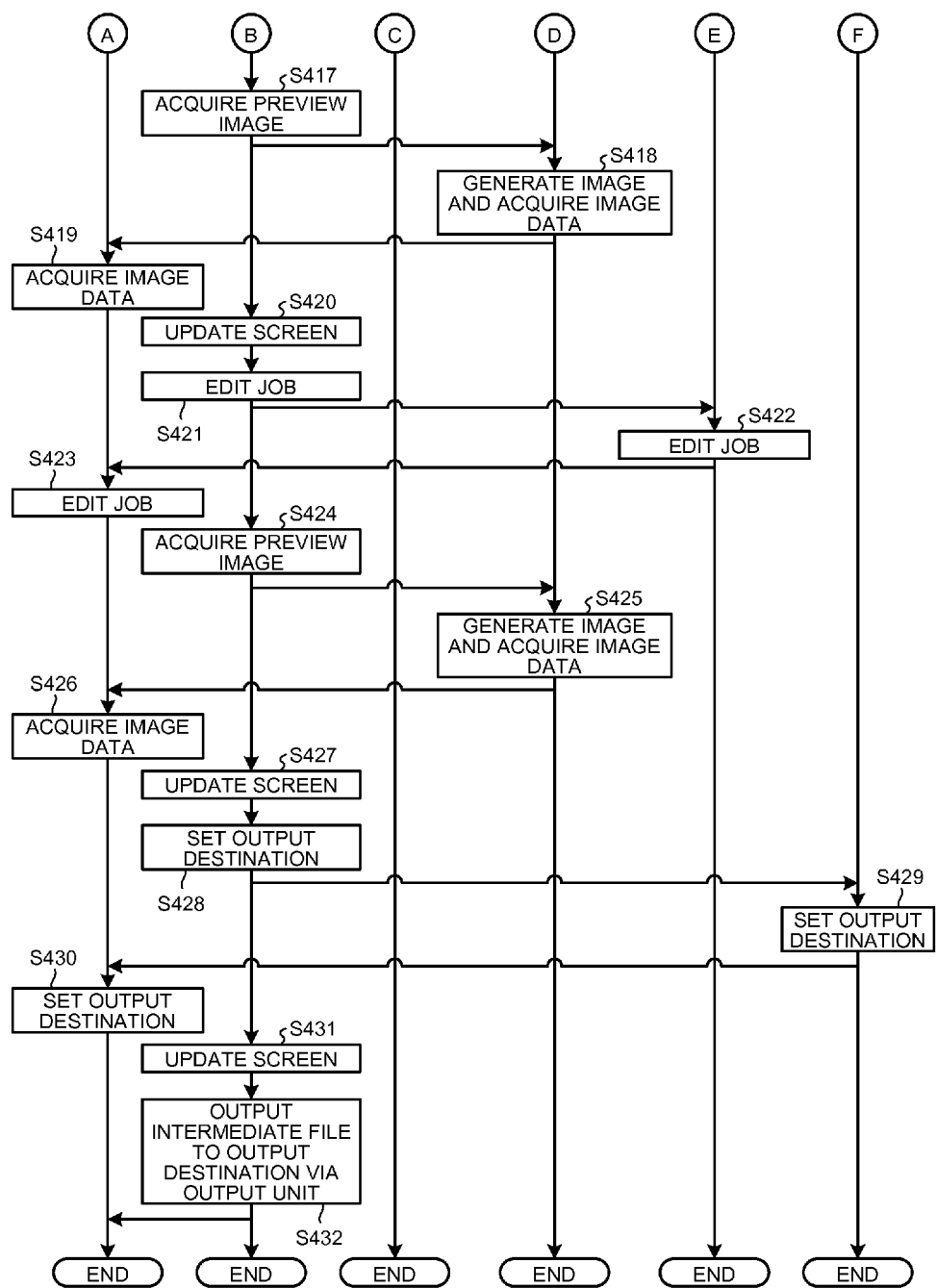
Figure 12A:
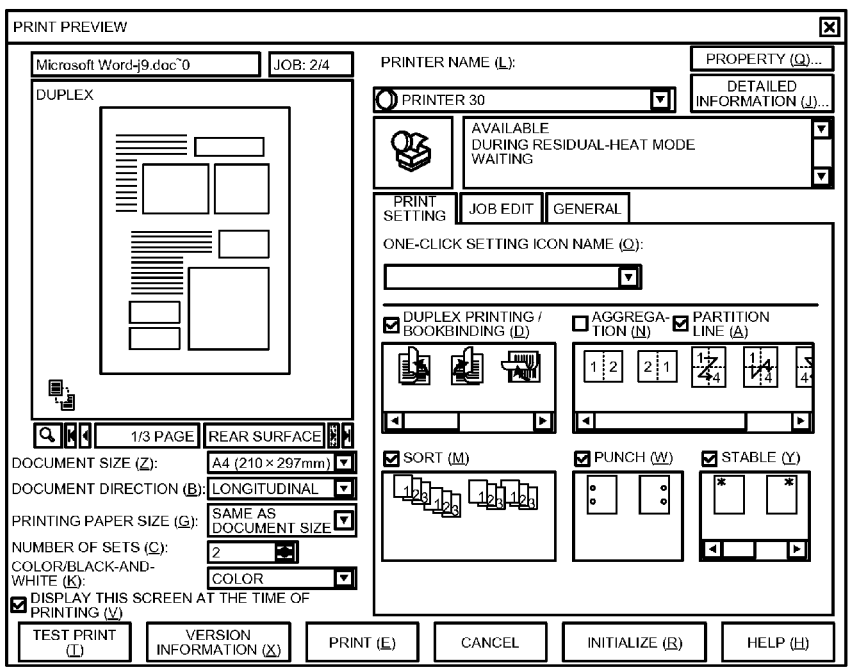
FIG. 12A illustrates an example of a print preview screen to which a print setting change is reflected.
Figure 12B:
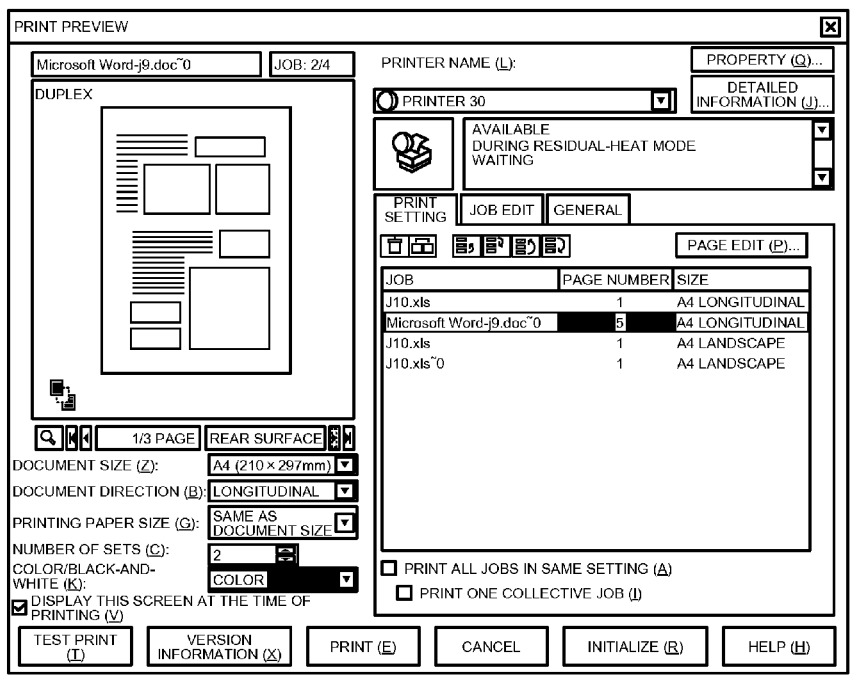
FIG. 12B illustrates an example of a print preview screen to which a job edit is reflected.
Figure 13:
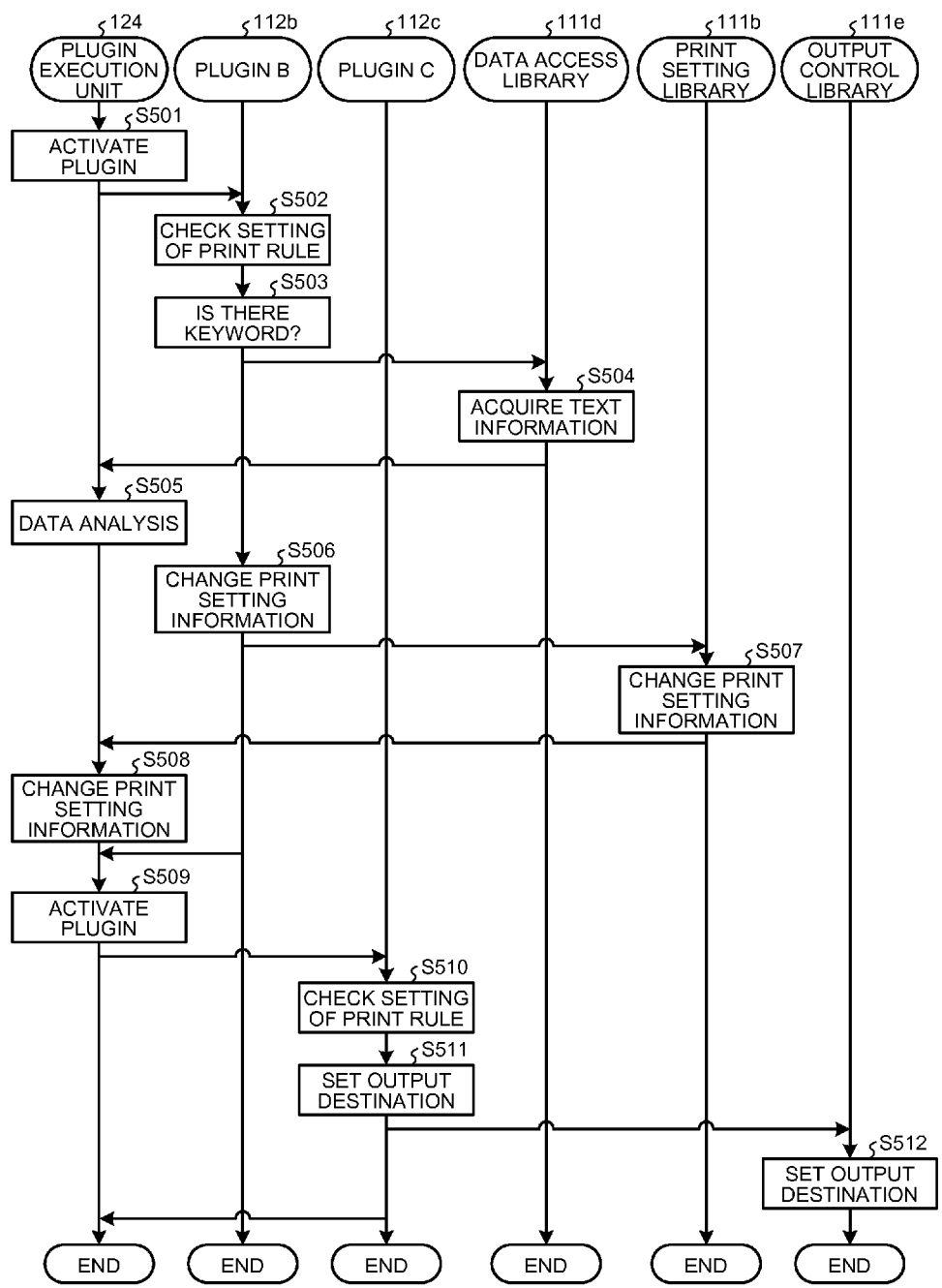
FIG. 13 illustrates an example of a sequence process by a plugin using a print setting library, a data access library and an output control library.
Figure 14:
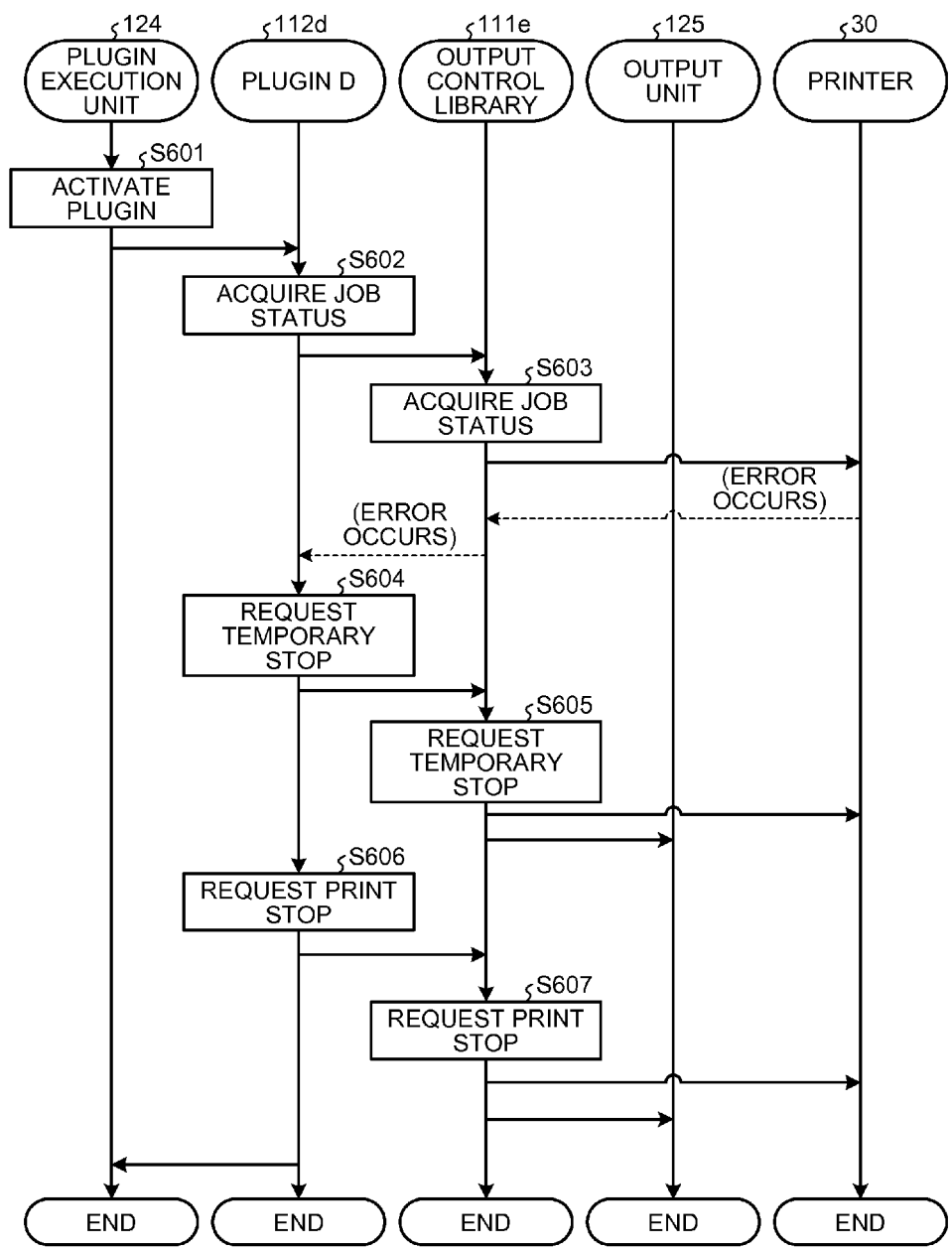
FIG. 14 illustrates an example of a sequence process by a plugin using an output control library.

Next, using FIGS. 11A to 14, processing by a plugin will be explained. FIGS. 11A and 11B are sequence diagrams illustrating a processing example by a plugin using the job edit library 111a, the print setting library 111b, the image generation library 111c and the output control library 111e. Also, FIG. 12A is a view illustrating an example of the print preview screen to which a print setting change is reflected. Also, FIG. 12B is a view illustrating an example of the print preview screen to which a job edit is reflected. Also, FIG. 13 is a sequence view illustrating a processing example by a plugin using the print setting library 111b, the data access library 111d and the output control library 111e. Also, FIG. 14 is a sequence view illustrating an example of processing by a plugin using the output control library 111e.

Plugin Processing Example 1

In plugin processing example 1, multiple libraries are used with respect to one plugin to adopt multiple print functions. For example, as illustrated in FIGS. 11A and 11B, the plugin execution unit 124 activates the plugin_A 112a (step S401). By this means, the plugin_A 112a activates a screen and displays a dialogue (step S402). Also, by executing the plugin_A 112a, the plugin execution unit 124 acquires the currently-set print setting information and a setting value at which a print setting is possible, using the print setting library 111b (step S403 to step S405).

Also, the plugin_A 112a acquires a preview image file representing an output result (step S406). By this means, the plugin execution unit 124 acquires image data generated and acquired by the image generation library 111c (steps S407 and S408). Also, by executing the plugin_A 112a, the plugin execution unit 124 acquires job information including the print job names of print targets and the job order, using the job edit library (steps S409 to S411).

Also, the plugin_A 112a searches for a printer that can perform an output among logical printers or physical printers using the output control library 111e, and acquires information (or list) of printers that can perform an output (steps S412 and S413). Also, the activated dialogue reflects the results of processes such as the acquisition of the print setting information, the acquisition of the preview image, the acquisition of the job information and the acquisition of the information of printers that can perform an output. Also, the activation process of screen, the acquisition process of the print setting information, the acquisition process of the preview image, the acquisition process of the job information and the acquisition process of the information of printers that can perform an output, may be performed in an asynchronous manner.

Also, when accepting a print setting change instruction via the dialogue by a user operation, by executing the plugin_A 112a, the plugin execution unit 124 changes the print setting information using the print setting library 111b (steps S414 to S416). Also, the plugin_A 112a acquires a preview image file (step S417). By this means, the plugin execution unit 124 acquires image data generated and acquired by the image generation library 111c (steps S418 and S419). Also, the plugin_A 112a updates the screen and reflects the print setting and the preview image to the screen (step S420). By this means, as illustrated in FIG. 12A, the print preview screen reflects the print setting and the preview image.

Also, when accepting a job edit instruction via the dialogue by a user operation, by executing the plugin_A 112a, the plugin execution unit 124 performs a job edit using the job edit library 111a (steps S421 to S423). By such the job edit, the plugin execution unit 124 updates the managed job information. Also, the plugin_A 112a acquires a preview image file (step S424). By this means, the plugin execution unit 124 acquires image data generated and acquired by the image generation library 111c (steps S425 and S426). Also, the plugin_A 112a updates the screen and reflects the job edit and the preview image to the screen (step S427). By this means, as illustrated in FIG. 12B, the print preview screen reflects the job edit and the preview image.

Also, when accepting an output destination setting instruction via the dialogue by a user operation, by executing the plugin_A 112a, the plugin execution unit 124 sets the output destination using the output control library 111e (steps S428 to S430). By such the output destination setting, the plugin execution unit 124 updates the managed output destination information. Also, the plugin_A 112a updates the screen and reflects the output destination change result to the screen (step S431). Also, when accepting a print instruction by the user, the plugin_A 112a outputs the intermediate file to the output destination printer via the output unit 125 (step S432). Here, the print setting change, the job edit and the output destination setting are not limited to the above order.

Plugin Processing Example 2

In plugin processing example 2, multiple edit plugins are sequentially activated and a print setting is changed based on content of rules set in advance. Such rules define the following content.

Rule 1: In a case where there is a character string "xxx" in a text, the print setting is changed to "yyy".

Rule 2:

The output destination is set to "zzz".

Here, the plugin_B 112b performs a process according to rule 1 and the plugin_C 112c performs processing according to rule 2. Also, regarding the plugins, it is assumed that the processes are performed in order from the plugin_B 112b and the plugin_C 112c.

For example, as illustrated in FIG. 13, the plugin execution unit 124 activates the plugin_B 112b (step S501). By this means, the plugin_B 112b checks a print rule file (step S502). Also, by executing the plugin_B 112b, the plugin execution unit 124 acquires text information using the data access library 111d and analyzes data to check whether there is a keyword in target print data (steps S503 to S505).

Also, in a case where there is the keyword, by executing the plugin_B 112b, the plugin execution unit 124 accepts a change request of print setting information using the print setting library 111b and updates the print setting information (steps S506 to S508). Here, the plugin_B 112b finishes the processing.

Also, when finding that the process in the plugin_B 112b is finished, the plugin execution unit 124 activates the plugin_C 112c (step S509). By this means, the plugin_C 112c checks a print rule file (step S510). Also, the plugin_C 112c sets the output destination using the output control library 111e (steps S511 and S512). Here, the plugin_C 112c finishes the processing.

Plugin Processing Example 3

In plugin processing example 3, a print job status is monitored by an output plugin, and, in a case where an error occurs in a printer that is performing an output, it is reported to the user by a pop-up window or the like. Also, the pop-up window mounts, for example, a button to instruct a stop of printing.

For example, as illustrated in FIG. 14, the plugin execution unit 124 activates the plugin_D 112d (step S601). By this means, the plugin_D 112d acquires a target print job status using the output control library 111e (steps S602 and S603). After that, in a case where some error occurs in the output destination printer, the plugin_D 112d outputs a temporary stop request of printing to the output unit 125 and the printer 30 using the output control library 111e (steps S604 and S605). Here, the plugin_D 112d displays a pop-up window to report that an error occurs.

Also, when accepting the print stop request via the pop-up window by a user operation, the plugin_D 112d outputs a print stop request to the output unit 125 and the printer 30 using the output control library 111e (steps S606 and S607). Here, the plugin_D 112d finishes the processing.

As described above, the information processing apparatus 100 registers a plugin combining libraries of various functions in the print process, executes the plugin and outputs an intermediate file to the output destination printer, and therefore it is possible to flexibly perform a print setting and simply perform printing reflecting the print setting. Also, at the time of plugin registration, the information processing apparatus 100 can determine whether it is possible to perform printing by the plugin, and therefore it is possible to suppress an output result that is not intended by the user at the time of printing.

Second Embodiment

In the above, although an embodiment of the information processing apparatus 100 according to an aspect of the present invention has been described, it may be implemented in various kinds of formats other than the above embodiment. Therefore, a different embodiment of (1) configuration and (2) program will be explained.

(1) Configuration

Information including the process steps, control steps, specific names and various kinds of data and parameters illustrated in the above description and figures may be arbitrarily changed if not otherwise specified. For example, libraries used as plugin components are not limited to the above and various libraries other than these may be used.

Also, each component of the illustrated information processing apparatus 100 is a functional concept and is not necessarily requested to be physically configured as illustrated. That is, the specific format of distribution/integration in each device is not limited to what is illustrated in the drawings, and, depending on various loads or a use status, it is possible to form them by functionally or physically distributing or integrating all or part of them in an arbitrary unit. For example, the plugin execution unit 124 may be distributed into a "management unit" that manages a job or intermediate file and a "plugin processing unit" that executes a process related to a plugin. Also, for example, functions of the registration unit 121 and the determining unit 122 may be used only by a manager of the print system 10, and functions of the generation unit 123, the plugin execution unit 124 and the output unit 125 may be used only by the user.

Figure 15:
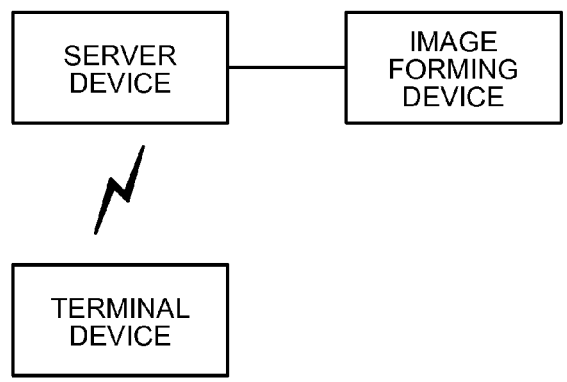
FIG. 15 is a diagram for explaining an example realized by an image forming device.

Also, various functions realized by the information processing apparatus 100 may be realized by a different configuration. FIG. 15 is a view for explaining an example realized by an image forming device. Such an image forming device may denote an MFP having at least a printer function among a copy function, the printer function, a scanner function and a facsimile function. For example, in the image forming device, when a request from a terminal device such as a portable terminal device is accepted via a server device, a plugin is executed by executing various functions of the information processing apparatus 100. However, a setting of output destination may be set on the terminal device side instead of the image forming device. There is a case where the number of set image forming devices is not one but multiple image forming devices are set.

(2) Program

Figure 16:
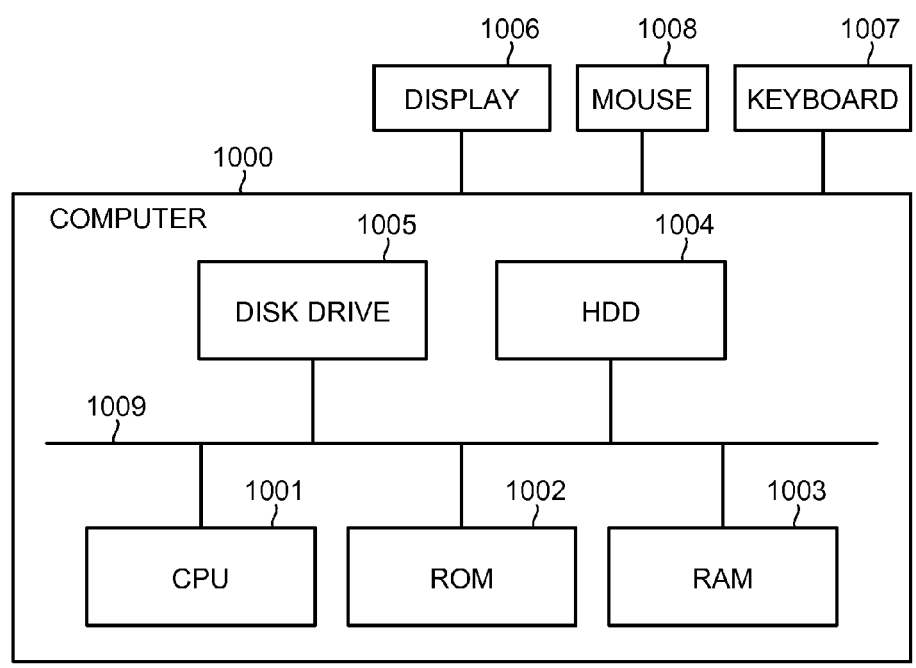
FIG. 16 is a diagram illustrating that a print process program is realized using a computer.

FIG. 16 is a view illustrating that a print process program is realized using a computer. For example, as illustrated in FIG. 16, a computer 1000 as the information processing apparatus 100 includes a control device such as a CPU 1001, a storage device such as a ROM 1002 and a RAM 1003, a hard disk drive (HDD) 1004, an external storage device such as a disk drive 1005, a display device such as a display 1006, and an input device such as a keyboard 1007 and a mouse 1008, where these components are connected by a bus 1009. That is, a hardware configuration using a normal computer is employed.

As one aspect, the print process program executed in the information processing apparatus 100 is provided after being stored in a computer-readable recording medium such as a CD-ROM, flexible disk (FD), CD-R and Digital Versatile Disk (DVD), as an installable format file or an executable format file. Also, it may be possible to employ a configuration in which the print process program executed by the information processing apparatus 100 is stored in a computer connected to a network such as the Internet and provided by downloading it via the network. Also, it may be possible to employ a configuration in which the print process program executed by the information processing apparatus 100 is provided or distributed via a network such as the Internet. Also, it may be possible to employ a configuration in which the print process program is imported in advance in a ROM or the like and provided.

The print process program executed by the information processing apparatus 100 employs a module configuration including the above components (i.e. the registration unit 121, the determining unit 122, the generation unit 123, the plugin execution unit 124 and the output unit 125), and, as actual hardware, the CPU (processor) reads the print process program from the storage medium and executes it such that each of the above components is loaded on the main storage device and the registration unit 121, the determining unit 122, the generation unit 123, the plugin execution unit 124 and the output unit 125 are produced in the main storage device.

According to the embodiments, there is an advantage that it is possible to flexibly perform a print setting.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing apparatus comprising:
at least one first processing unit configured to execute an associated process related to a print edit, the processes related to the print edit being generic to multiple print drivers such that the processes related to the print edit are performed with respect to a virtual printer;
at least one second processing unit configured to execute an associated process related to a print output, the processes related to the print output including at least setting a destination printer;
a registration unit configured to register workflow definition information which defines an order of execution of selected ones of the first and second processing units to define the order of executing the associated processes related to the print edit and the print output, the workflow definition information being associated with the virtual printer such that the workflow definition information is generic to the multiple print drivers and indicates the order of executing the print edit and print output; and
an execution unit configured to execute the selected ones of the first and second processing units based on the workflow definition information by,
first determining whether the associated processes to be executed based on the workflow definition information include processes related to the print edit executed by the first processing unit,
executing, by the first processing unit, the processes related to print edit based on print setting information with respect to print target image data and print rule information which defines conditions for performing the processes, the print rule information including a rule instructing the first processing unit to analyze text information of print data to determine whether the print data is text and change the print setting information, if the print data is text;
second determining whether the associated processes to be executed based on the workflow definition information include processes related to the print output executed by the second processing unit when all of the first processing unit defined in the workflow definition information have been executed; and
executing, by the second processing unit, the processes related to print output based on the print setting information and the print rule information.

2. The information processing apparatus according to claim 1, further comprising:
a determining unit configured to determine whether it is possible to execute the processes based on the workflow definition information by determining whether there are a plurality of the first processing units executing a print setting process with a same print setting item or whether there are a plurality of the second processing units in the workflow definition information, wherein the registration unit registers the workflow definition information determined by the determining unit as executable.

3. The information processing apparatus according to claim 1, wherein each of the workflow definition information registered by the registration unit corresponds to the virtual printer, and the execution unit is configured to execute the processes based on the workflow definition information corresponding to the virtual printer selected by a user.

4. An information processing method executed on an information processing apparatus including first processing units and second processing units, the first processing units configured to execute associated processes related to print editing and second processing units configured to execute associated processes related to print outputting, the processes related to the print editing being generic to multiple print drivers such that the processes related to the print editing are performed with respect to a virtual printer and the processes related to the print outputting including at least setting a destination printer, the method comprising:

registering workflow definition information which defines an order of execution of selected ones of the first and second processing units to define the order of executing the associated processes related to the print editing and the print outputting, the workflow definition information being associated with the virtual printer such that the workflow definition information is generic to the multiple print drivers and indicates the order of executing the print editing and the print outputting; and executing the selected ones of the first and second processing units based on the workflow definition information by, first determining whether the associated processes to be executed based on the workflow definition information include processes related to the print editing executed by the first processing units, executing, by the first processing unit, the processes related to print editing based on print setting information with respect to print target image data and print rule information which defines conditions for performing the processes, the print rule information including a rule instructing the first processing unit to analyze text information of print data to determine whether the print data is text and change the print setting information, if the print data is text, second determining whether the associated processes to be executed based on the workflow definition information include processes related to the print outputting executed by the second processing units when all of the first processing units defined in the workflow definition information have been executed, and executing, by the second processing unit, the processes related to print outputting based on the print setting information and the print rule information.

5. The information processing method according to claim 4, further comprising:

determining whether it is possible to execute the processes based on the workflow definition information by determining whether there are a plurality of the first processing units executing a print setting process with a same print setting item or whether there are a plurality of the second processing units in the workflow definition information, wherein the registering includes registering the workflow definition information determined at the determining as executable.

6. The information processing method according to claim 4, wherein each of the workflow definition information registered by the registration operation corresponds to the virtual printer, and the executing executes the processes based on the workflow definition information corresponding to the virtual printer selected by a user.

7. A non-transitory computer-readable storage medium with an executable program stored thereon, wherein the program instructs a information processing apparatus including first processing units and second processing units, the first processing units configured to execute associated processes related to print editing and second processing units configured to execute associated processes related to print outputting, the processes related to the print editing being generic to multiple print drivers such that the processes related to the print editing are performed with respect to a virtual printer and the processes related to the print outputting including at least setting a destination printer, to perform:

registering workflow definition information which defines an order of execution of selected ones of the first and second processing units to define the order of executing the associated processes related to the print editing and the print outputting, the workflow definition information being associated with the virtual printer such that the workflow definition information is generic to the multiple print drivers and indicates the order of executing the print editing and the print outputting; and executing the selected ones of the first and second processing units based on the workflow definition information by, first determining whether the associated processes to be executed based on the workflow definition information include processes related to the print editing executed by the first processing units, executing, by the first processing unit, the processes related to print editing based on print setting information with respect to print target image data and print rule information which defines conditions for performing the processes, the print rule information including a rule instructing the first processing unit to analyze text information of print data to determine whether the print data is text and change the print setting information, if the print data is text, second determining whether the associated processes to be executed based on the workflow definition information include processes related to the print outputting executed by the second processing units when all of the first processing units defined in the workflow definition information have been executed, and executing, by the second processing unit, the processes related to print outputting based on the print setting information and the print rule information.

8. The non-transitory computer-readable storage medium according to claim 7, wherein the program further instructs the computer to perform determining whether it is possible to execute the processes based on the workflow definition information by determining whether there are a plurality of the first processing units executing a print setting process with a same print setting item or whether there are a plurality of the second processing units in the workflow definition information, wherein the registering includes registering the workflow definition information determined at the determining as executable.

9. The non-transitory computer-readable storage medium according to claim 7, wherein each of the workflow definition information registered by the registration operation corresponds to the virtual printer, and the executing executes the processes based on the workflow definition information corresponding to the virtual printer selected by a user.

\* \* \* \* \*